US011188086B2

United States Patent
Vogel et al.

(10) Patent No.: US 11,188,086 B2
(45) Date of Patent: Nov. 30, 2021

(54) IDENTIFICATION AND LOCALIZATION OF A BASE STATION OF AN AUTONOMOUS MOBILE ROBOT

(71) Applicant: RobArt GmbH, Linz (DE)

(72) Inventors: Reinhard Vogel, Linz (DE); Harald Artes, Linz (DE); Christoph Freudenthaler, Linz (DE); Fabian Lenhardt, Linz (DE)

(73) Assignee: RobArtGmbH, Linz (DE)

( * ) Notice: Subject to any disclaimer, the term of this patent is extended or adjusted under 35 U.S.C. 154(b) by 422 days.

(21) Appl. No.: 15/757,245

(22) PCT Filed: Sep. 2, 2016

(86) PCT No.: PCT/EP2016/070761
§ 371 (c)(1),
(2) Date: Mar. 2, 2018

(87) PCT Pub. No.: WO2017/037257
PCT Pub. Date: Mar. 9, 2017

(65) Prior Publication Data
US 2018/0246518 A1 Aug. 30, 2018

(30) Foreign Application Priority Data
Sep. 4, 2015 (DE) ...................... 10 2015 114 883.8

(51) Int. Cl.
*G05D 1/02* (2020.01)
*B25J 9/00* (2006.01)

(52) U.S. Cl.
CPC .......... *G05D 1/0225* (2013.01); *B25J 9/0003* (2013.01); *G05D 1/0234* (2013.01);
(Continued)

(58) Field of Classification Search
CPC .... G06N 3/008; A61B 19/22; A61B 19/5212; B25J 13/085; B25J 9/1666; B25J 9/1676;
(Continued)

(56) References Cited

U.S. PATENT DOCUMENTS 4,674,048 A 6/1987 Okumura
4,740,676 A 4/1988 Satoh et al.
(Continued)

FOREIGN PATENT DOCUMENTS

AU 2015322263 4/2017
CA 2322419 9/1999
(Continued)

OTHER PUBLICATIONS

JP2009238055.english.translation (Year: 2009).*
(Continued)

*Primary Examiner* — B M M Hannan
(74) *Attorney, Agent, or Firm* — Akerman LLP; Peter A. Chiabotti

(57) ABSTRACT

In the following, a system having an autonomous mobile robot and a base station for the robot is described. In accordance with one example, the robot comprises a navigation module with a navigation sensor for detecting geometric features of objects in the environment of the robot. The base station has at least one geometric feature which can be detected by the robot by means of the navigation sensor. The robot includes a robot controller that is coupled with the navigation module, the robot controller being configured to identify and/or localize the base station and/or to determine a docking position of the robot based on the at least one geometric feature of the base station.

21 Claims, 3 Drawing Sheets

(52) U.S. Cl.
CPC ......... *G05D 1/0238* (2013.01); *G05D 1/0274* (2013.01); *G05D 2201/0215* (2013.01)

(58) Field of Classification Search
CPC ......... B25J 9/0003; G05B 2219/45083; G05B 19/4061; G05B 2219/39082; G05B 2219/40476; B62D 57/032; G05D 1/0274; G05D 1/0255; G05D 1/0246; G05D 1/0225; G05D 1/0234; G05D 1/0238; G05D 2201/0215
USPC .................. 700/243, 245, 255, 258, 262
See application file for complete search history.

(56) References Cited

U.S. PATENT DOCUMENTS

| | | |
|---|---|---|
| 4,777,416 A | 10/1988 | George, II et al. |
| 5,109,566 A | 5/1992 | Kobayashi et al. |
| 5,260,710 A | 11/1993 | Omamyuda et al. |
| 5,284,522 A | 2/1994 | Kobayashi et al. |
| 5,377,106 A | 12/1994 | Drunk et al. |
| 5,402,051 A | 3/1995 | Fujiwara et al. |
| 5,696,675 A | 12/1997 | Nakamura et al. |
| 5,787,545 A | 8/1998 | Colens |
| 5,995,884 A | 11/1999 | Allen et al. |
| 6,366,219 B1 | 4/2002 | Hoummady |
| 6,389,329 B1 | 5/2002 | Colens |
| 6,532,404 B2 | 3/2003 | Colens |
| 6,594,844 B2 | 7/2003 | Jones |
| 6,605,156 B1 | 8/2003 | Clark et al. |
| 6,615,108 B1 | 9/2003 | Peless et al. |
| 6,667,592 B2 | 12/2003 | Jacobs et al. |
| 6,690,134 B1 | 2/2004 | Jones et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,965,209 B2 | 11/2005 | Jones et al. |
| 6,972,834 B1 | 12/2005 | Oka et al. |
| 7,155,308 B2 | 12/2006 | Jones |
| 7,173,391 B2 | 2/2007 | Jones et al. |
| 7,196,487 B2 | 3/2007 | Jones et al. |
| 7,302,345 B2 | 11/2007 | Kwon et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,483,151 B2 | 1/2009 | Zganec et al. |
| 7,507,948 B2 | 3/2009 | Park et al. |
| 7,539,557 B2 | 5/2009 | Yamauchi |
| 7,571,511 B2 | 8/2009 | Jones et al. |
| 7,636,982 B2 | 12/2009 | Jones et al. |
| 7,656,541 B2 | 2/2010 | Waslowski et al. |
| 7,761,954 B2 | 7/2010 | Ziegler et al. |
| 7,801,676 B2 | 9/2010 | Kurosawa et al. |
| 8,438,695 B2 | 5/2013 | Gilbert et al. |
| 8,594,019 B2 | 11/2013 | Misumi |
| 8,739,355 B2 | 6/2014 | Morse et al. |
| 8,855,914 B1 | 10/2014 | Alexander et al. |
| 8,892,251 B1 | 11/2014 | Dooley et al. |
| 8,921,752 B2 | 12/2014 | Iizuka |
| 8,982,217 B1 | 3/2015 | Hickman |
| 9,002,511 B1 | 4/2015 | Hickerson et al. |
| 9,026,302 B2 | 5/2015 | Stout et al. |
| 9,037,294 B2 | 5/2015 | Chung |
| 9,043,017 B2 | 5/2015 | Jung et al. |
| 9,149,170 B2 | 10/2015 | Ozick et al. |
| 9,220,386 B2 | 12/2015 | Gilbert, Jr. et al. |
| 9,486,924 B2 | 11/2016 | Dubrovsky et al. |
| 9,717,387 B1 | 8/2017 | Szatmary et al. |
| 10,228,697 B2 | 3/2019 | Yoshino |
| 2002/0016649 A1 | 2/2002 | Jones |
| 2002/0103575 A1 | 8/2002 | Sugawara |
| 2002/0120364 A1 | 8/2002 | Colens |
| 2003/0025472 A1 | 2/2003 | Jones et al. |
| 2003/0030398 A1 | 2/2003 | Jacobs et al. |
| 2003/0120389 A1 | 6/2003 | Abramson |
| 2003/0142925 A1 | 7/2003 | Melchior et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0000543 A1 | 1/2005 | Taylor et al. |
| 2005/0010331 A1 | 1/2005 | Taylor et al. |
| 2005/0041839 A1 | 2/2005 | Saitou et al. |
| 2005/0067994 A1 | 3/2005 | Jones et al. |
| 2005/0156562 A1 | 7/2005 | Cohen et al. |
| 2005/0171636 A1 | 8/2005 | Tani |
| 2005/0171644 A1 | 8/2005 | Tani |
| 2005/0204717 A1 | 9/2005 | Colens |
| 2005/0212680 A1 | 9/2005 | Uehigashi |
| 2005/0256610 A1 | 11/2005 | Orita |
| 2006/0020369 A1 | 1/2006 | Taylor |
| 2006/0095158 A1 | 5/2006 | Lee et al. |
| 2006/0237634 A1 | 10/2006 | Kim |
| 2007/0027579 A1 | 2/2007 | Suzuki et al. |
| 2007/0061041 A1 | 3/2007 | Zweig |
| 2007/0234492 A1 | 10/2007 | Svendsen et al. |
| 2007/0266508 A1 | 11/2007 | Jones et al. |
| 2007/0282484 A1 | 12/2007 | Chung |
| 2008/0046125 A1 | 2/2008 | Myeong et al. |
| 2008/0140255 A1 | 6/2008 | Ziegler et al. |
| 2008/0155768 A1 | 7/2008 | Ziegler et al. |
| 2008/0192256 A1 | 8/2008 | Wolf et al. |
| 2008/0307590 A1 | 12/2008 | Jones et al. |
| 2009/0048727 A1 | 2/2009 | Hong et al. |
| 2009/0051921 A1 | 2/2009 | Masahiko |
| 2009/0177320 A1 | 7/2009 | Lee et al. |
| 2009/0182464 A1 | 7/2009 | Myeong et al. |
| 2009/0281661 A1 | 11/2009 | Dooley et al. |
| 2010/0030380 A1 | 2/2010 | Shah et al. |
| 2010/0049365 A1 | 2/2010 | Jones et al. |
| 2010/0082193 A1 | 4/2010 | Chiappetta |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0324731 A1* | 12/2010 | Letsky ................ G05D 1/0274 700/245 |
| 2010/0324736 A1 | 12/2010 | Yoo et al. |
| 2011/0054689 A1 | 3/2011 | Nielsen et al. |
| 2011/0137461 A1 | 6/2011 | Kong et al. |
| 2011/0194755 A1 | 8/2011 | Jeong et al. |
| 2011/0211731 A1 | 9/2011 | Lee et al. |
| 2011/0224824 A1 | 9/2011 | Lee et al. |
| 2011/0236026 A1 | 9/2011 | Yoo et al. |
| 2011/0238214 A1 | 9/2011 | Yoo et al. |
| 2011/0264305 A1 | 10/2011 | Choe et al. |
| 2011/0278082 A1 | 11/2011 | Chung et al. |
| 2011/0295420 A1* | 12/2011 | Wagner ................ G05D 1/0225 700/245 |
| 2012/0008128 A1 | 1/2012 | Bamji |
| 2012/0013907 A1 | 1/2012 | Jung et al. |
| 2012/0022785 A1 | 1/2012 | DiBernardo et al. |
| 2012/0060320 A1 | 3/2012 | Lee et al. |
| 2012/0069457 A1 | 3/2012 | Wolf et al. |
| 2012/0169497 A1 | 7/2012 | Schnittman et al. |
| 2012/0173070 A1 | 7/2012 | Schnittman |
| 2012/0215380 A1 | 8/2012 | Fouillade et al. |
| 2012/0223216 A1 | 9/2012 | Flaherty et al. |
| 2012/0265370 A1 | 10/2012 | Kim et al. |
| 2012/0271502 A1 | 10/2012 | Lee |
| 2012/0283905 A1 | 11/2012 | Nakano et al. |
| 2013/0001398 A1 | 1/2013 | Wada et al. |
| 2013/0024025 A1 | 1/2013 | Hsu |
| 2013/0166134 A1 | 6/2013 | Shitamoto |
| 2013/0206177 A1 | 8/2013 | Burlutskiy |
| 2013/0217421 A1 | 8/2013 | Kim |
| 2013/0221908 A1 | 8/2013 | Tang |
| 2013/0261867 A1* | 10/2013 | Burnett ................ G05D 1/0272 701/23 |
| 2013/0265562 A1 | 10/2013 | Tang et al. |
| 2013/0317944 A1 | 11/2013 | Huang et al. |
| 2014/0005933 A1 | 1/2014 | Fong et al. |
| 2014/0098218 A1 | 4/2014 | Wu et al. |
| 2014/0100693 A1* | 4/2014 | Fong ................ A47L 9/2873 700/253 |

(56) References Cited

U.S. PATENT DOCUMENTS

| | | |
|---|---|---|
| 2014/0115797 A1 | 5/2014 | Duenne |
| 2014/0124004 A1 | 5/2014 | Rosenstein et al. |
| 2014/0128093 A1 | 5/2014 | Das et al. |
| 2014/0156125 A1 | 6/2014 | Song et al. |
| 2014/0207280 A1 | 7/2014 | Duffley et al. |
| 2014/0207281 A1 | 7/2014 | Angle et al. |
| 2014/0207282 A1 | 7/2014 | Angle et al. |
| 2014/0218517 A1 | 8/2014 | Kim et al. |
| 2014/0257563 A1 | 9/2014 | Park et al. |
| 2014/0257564 A1 | 9/2014 | Sun et al. |
| 2014/0257565 A1 | 9/2014 | Sun et al. |
| 2014/0303775 A1 | 10/2014 | Oh et al. |
| 2014/0316636 A1 | 10/2014 | Hong et al. |
| 2014/0324270 A1 | 10/2014 | Chang et al. |
| 2014/0343783 A1 | 11/2014 | Lee |
| 2015/0115138 A1 | 4/2015 | Heng et al. |
| 2015/0115876 A1 | 4/2015 | Noh et al. |
| 2015/0120056 A1 | 4/2015 | Noh et al. |
| 2015/0151646 A1 | 6/2015 | Noiri |
| 2015/0168954 A1 | 6/2015 | Hickerson et al. |
| 2015/0173578 A1 | 6/2015 | Kim et al. |
| 2015/0202772 A1 | 7/2015 | Kim |
| 2015/0212520 A1 | 7/2015 | Artes et al. |
| 2015/0223659 A1 | 8/2015 | Han et al. |
| 2015/0260829 A1 | 9/2015 | Wada |
| 2015/0265125 A1 | 9/2015 | Lee et al. |
| 2015/0314453 A1* | 11/2015 | Witelson ............... E04H 4/1654 320/108 |
| 2015/0367513 A1 | 12/2015 | Gettings et al. |
| 2016/0008982 A1* | 1/2016 | Artes .................... B25J 9/1692 700/254 |
| 2016/0037983 A1 | 2/2016 | Hillen et al. |
| 2016/0041029 A1 | 2/2016 | T'ng et al. |
| 2016/0066759 A1 | 3/2016 | Langhammer et al. |
| 2016/0103451 A1 | 4/2016 | Vicenti |
| 2016/0132056 A1 | 5/2016 | Yoshino |
| 2016/0150933 A1 | 6/2016 | Duenne et al. |
| 2016/0165795 A1 | 6/2016 | Balutis et al. |
| 2016/0166126 A1* | 6/2016 | Morin .................... A47L 9/2805 15/319 |
| 2016/0209217 A1 | 7/2016 | Babu et al. |
| 2016/0213218 A1 | 7/2016 | Ham et al. |
| 2016/0500161 | 7/2016 | Van Den Bossche et al. |
| 2016/0229060 A1 | 8/2016 | Kim et al. |
| 2016/0271795 A1* | 9/2016 | Vicenti ................. G05D 1/0274 |
| 2016/0282873 A1 | 9/2016 | Masaki et al. |
| 2016/0297072 A1 | 10/2016 | Williams et al. |
| 2016/0298970 A1* | 10/2016 | Lindhe ................. A47L 11/4041 |
| 2017/0001311 A1* | 1/2017 | Bushman ................ G01S 17/93 |
| 2017/0083022 A1 | 3/2017 | Tang |
| 2017/0147000 A1 | 5/2017 | Hoennige et al. |
| 2017/0164800 A1* | 6/2017 | Arakawa ............... A47L 9/2873 |
| 2017/0177001 A1 | 6/2017 | Cao et al. |
| 2017/0197314 A1 | 7/2017 | Stout et al. |
| 2017/0231452 A1 | 8/2017 | Saito et al. |
| 2017/0364087 A1 | 12/2017 | Tang et al. |

FOREIGN PATENT DOCUMENTS

| | | |
|---|---|---|
| CN | 1381340 | 11/2002 |
| CN | 1696612 | 11/2005 |
| CN | 101945325 | 1/2011 |
| CN | 102738862 | 10/2012 |
| CN | 104460663 | 3/2015 |
| CN | 104634601 | 5/2015 |
| CN | 104765362 | 7/2015 |
| CN | 105045098 | 11/2015 |
| CN | 105334847 | 2/2016 |
| CN | 105467398 | 4/2016 |
| CN | 105527619 | 4/2016 |
| CN | 203672362 | 6/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| EP | 142594 | 5/1985 |
| EP | 402764 | 12/1990 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2853976 | 4/2015 |
| EP | 2870852 | 5/2015 |
| EP | 3079030 | 11/2015 |
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2004133882 | 4/2004 |
| JP | 2005205028 | 8/2005 |
| JP | 2009238055 | 10/2009 |
| JP | 2010227894 | 10/2010 |
| JP | 201307708 | 4/2013 |

(56) References Cited

FOREIGN PATENT DOCUMENTS

| | | | | |
|---|---|---|---|---|
| JP | 2014176260 | 9/2014 | | |
| JP | 201541203 | 3/2015 | | |
| KR | 100735565 | 5/2006 | | |
| KR | 100815545 | 3/2008 | | |
| KR | 20110092158 | 8/2011 | | |
| KR | 20140073854 | 6/2014 | | |
| KR | 20140145648 | 12/2014 | | |
| KR | 20150009413 | 1/2015 | | |
| KR | 20150124011 | 11/2015 | | |
| KR | 20150124013 | 11/2015 | | |
| KR | 20150124014 | 11/2015 | | |
| KR | 20150127937 | 11/2015 | | |
| WO | 9523346 | 8/1995 | | |
| WO | 99/28800 | 6/1999 | | |
| WO | 200004430 | 1/2000 | | |
| WO | 2005074362 | 8/2005 | | |
| WO | 2007028667 | 3/2007 | | |
| WO | 2012099694 | 7/2012 | | |
| WO | 2012157951 | 11/2012 | | |
| WO | WO2013116887 | * | 8/2013 | ............ B25J 9/1692 |
| WO | 2014017256 | 1/2014 | | |
| WO | 2014043732 | 3/2014 | | |
| WO | 2014055966 | 4/2014 | | |
| WO | 2014113091 | 7/2014 | | |
| WO | 2014138472 | 9/2014 | | |
| WO | 2015025599 | 2/2015 | | |
| WO | 2015072897 | 5/2015 | | |
| WO | 2015082017 | 6/2015 | | |
| WO | 2015090398 | 6/2015 | | |
| WO | 2015158240 | 10/2015 | | |
| WO | 2015181995 | 12/2015 | | |
| WO | 2016019996 | 2/2016 | | |
| WO | 2016027957 | 2/2016 | | |
| WO | 2016028021 | 2/2016 | | |
| WO | 2016048077 | 3/2016 | | |
| WO | 2016091312 | 6/2016 | | |
| WO | 2016095966 | 6/2016 | | |

OTHER PUBLICATIONS

Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.

Patent Cooperation Treaty, "International Search Report and Written Opinion," and English translation of international search, issued in International Patent Application No. PCT/EP2016/070761, dated Feb. 9, 2017, document of 22 pages.

German Patent Office, "Office Action," issued in German Patent Application No. DE 10 2015 114 883.8, dated May 31, 2016, document of 6 pages.

Oh et al., "Autonomous Battery Recharging for Indoor Mobile Robots", Massachussets Institute of Technology Press, Aug. 30, 2000, XP055321836.

Siegwart, "introduction to autonomous mobile robots", Massachusetts, ISBN 978-0-26-219502-7, (2004), URL: http://www.robotee.com/EBooks/Introduction_to_Autonomous_Mobile_Robots.pdf, XP055054850.

Choset et al., "Principles of Robot Motion", Theory, Algorithms, and Implementations, Chapter 6—Cell decompositions, 2004, document of 41 pages.

Durrant-Whyte et al., "Simultaneous Localization and Mapping (SLAM): Part I the Essential Algorithms", in: IEEE Robotics and Automation Magazine, vol. 13, No. 2, pp. 99-108, Jun. 2006.

Konolige et al., "A Low-Cost Laser Distance Sensor," 2008 IEEE International Conference on Robotics and Automation, Pasadena, CA, USA, May 19-23, 2008, document of 7 pages.

Lymberopoulos et al., "A Realistic Evaluation and Comparison of Indoor Location Technologies: Experiences and Lessons Learned," IPSN '15, Apr. 14-16, 2015, Seattle, WA, USA, document of 12 pages. http://dx.doi.org/10.1145/2737095.27.

Forlizzi, Flow robotic products become social products: An ethnographic study of cleaning in the home, 2007, IEEE, p. 129-136 (Year: 2007).

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Neto et al., Human-Machine Interface Based on Electro-Biological Signals for Mobile Vehicles, 2006, IEEE, p. 2954-2959 (Year: 2006).

The State Intellectual Property Office of the People's Republic of China, "The First Office Action," and English language translation thereof, issued in Chinese Patent Application No. 201680063343.X, dated Oct. 29, 2020, document of 23 pages.

Japanese Patent Office, "Notice of Reasons of Refusal," and English language translation thereof, issued in Japanese Patent Application No. 2018-511638 dated Jul. 21, 2020, document of 10 pages.

* cited by examiner

IDENTIFICATION AND LOCALIZATION OF A BASE STATION OF AN AUTONOMOUS MOBILE ROBOT

CROSS REFERENCE TO RELATED APPLICATIONS

This application is a § 371 National Phase of PCT/EP2016/070761, filed Sep. 2, 2016, which claims priority to German patent application DE 10 2015 114 883.8, filed Sep. 4, 2015, the disclosure of both of which is incorporated herein by reference.

TECHNICAL FIELD

The application relates to a method for the identification and localization of a base station of an autonomous mobile robot by the robot. It is further described how the base station may be employed for the calibration of a sensor of the robot and how the docking maneuver may be improved.

BACKGROUND

In recent years, autonomous mobile robots, in particular service robots, are being increasingly employed in the household, for example, for cleaning or to monitor a home. When these robots are not performing their tasks, they are generally docked to a base station. This allows, for example, the charging of a battery, the cleaning of a dirt collection container or the refilling of the robot's cleaning fluid to be carried out by the base station. In order for the robot to operate fully autonomously, it is important for it to be capable of reliably finding its way back to the base station. Various ways of achieving this described task are known. The publications US 2009 0281 661 A1 and US 2014 0100 693 A contain background information on this subject.

In general, one aspect consists in simplifying or improving known methods for identifying and locating a robot base station by the robot as well as the known methods for docking onto the base station.

SUMMARY

The problem described above is solved by means of a system, base station and methods disclosed herein. Various embodiments and further developments of the are the subject matter of the independent claims.

In the following a system having an autonomous mobile robot and a base station for the robot will be described. In accordance with one example of the present disclosure, the robot comprises a navigation module with a navigation sensor for detecting the geometric features of objects in the environment of the robot. The base station has at least one geometric feature that can be detected by the robot by means of the navigation sensor. The robot includes a robot controller that is coupled to the navigation module and which is configured, based on the at least one geometric feature of the base station, to identify the base station and/or to localize and/or to determine a docking position of the robot.

A further example of the application relates to a base station for a mobile robot. The base station has a housing with at least one opening arranged in the housing which, due to its geometry, defines at least one geometric feature that is detectable by the sensor system of the robot.

Further, a method for an autonomous mobile robot will be described. In accordance with one example of the application, the method comprises the detection of geometric features of objects in the environment of the robot by means of a navigation module of the robot which has a navigation sensor. At least one of the thus detected objects is a geometric feature of the base station. The method further comprises the identification and/or localization of the base station based on the at least one geometric feature of the base station.

In accordance with a further example of a system having an autonomous mobile robot and a base station, the robot comprises a navigation module with a navigation sensor for the detection of geometric features of objects in the environment of the robot. The base station has at least one geometric feature that can be detected by the robot by means of a navigation sensor. The navigation module is configured to test and/or calibrate the navigation sensor with the aid of the at least one detected geometric feature of the base station.

Further embodiments relate to methods for an autonomous mobile robot. In accordance with one example a method comprises the detection of geometric features in the environment of robot by means of a navigation module of the robot which has a navigation sensor, wherein at least one of the detected features is a geometric feature of the base station. The navigation sensor is calibrated and/or tested with the aid of the at least one geometric feature of the base station.

A further method serves to dock an autonomous mobile robot onto a base station. In accordance with one embodiment, the method comprises the detection of a docking position of the robot on the base station, wherein the docking position comprises a location and an orientation of the robot, as well as the navigation of the robot into the docking position. Afterwards it is tested whether the robot has correctly docked onto the base station. If this is not the case, the position of the robot is varied and it is once again tested whether the robot has correctly docked onto the base station. The varying and testing is carried out until either the test is successful or an abort criterion is fulfilled.

In accordance with a further embodiment, a method for the automatic docking of an autonomous mobile robot onto a base station includes the detection of obstacles by means of a navigation module of the robot which has a navigation sensor, as well as testing whether, within a defined area around the base station, access to the base station for the robot is impeded by detected obstacles. If the test reveals that access to the base station is impeded for the robot, a disturbance is communicated via a user interface.

A further exemplary method for an autonomous mobile robot includes the detection of geometric features of objects in the environment of the robot by means of a navigation module of the robot which comprises a navigation sensor, as well as the navigation of the robot based on at least one of the detected geometric features and on an electronic map of the area in which the robot operates. The position of a base station of the robot is designated on the electronic map. The method further includes testing whether the detected geometric features contain a geometric feature that is linked with the base station. If this is the case, the current position of the base station is determined based on the geometric feature that is linked with the base station and the position of the base station is updated on the electronic map. Alternatively, the base station may be detected and located in a different manner in order to update its position on the map of the robot.

A further example of a method for an autonomous mobile robot includes the detection of geometric features of objects in the environment of the robot by means of a navigation module of the robot which comprises a navigation sensor, as well as the navigation of the robot based on at least one of the detected geometric features and on an electronic map of the area in which the robot operates. The position of a base station of the robot is designated on the electronic map. In accordance with the method, a first geometric feature that is not defined by the base station is linked with the position of the base station. This first geometric feature is tracked using a SLAM algorithm, wherein a position of the first geometric feature on the electronic map is kept current and the position of the base station is saved as a relative position relative to the position of the first geometric feature.

BRIEF DESCRIPTION OF THE FIGURES

In the following, the present disclosure is described in greater detail by means of the examples shown in the figures. The figures are not necessarily to scale and the invention is not limited to only the shown aspects. Instead emphasis is placed on illustrating the underlying principles of the application. The figures show.

DETAILED DESCRIPTION

Figure 1:
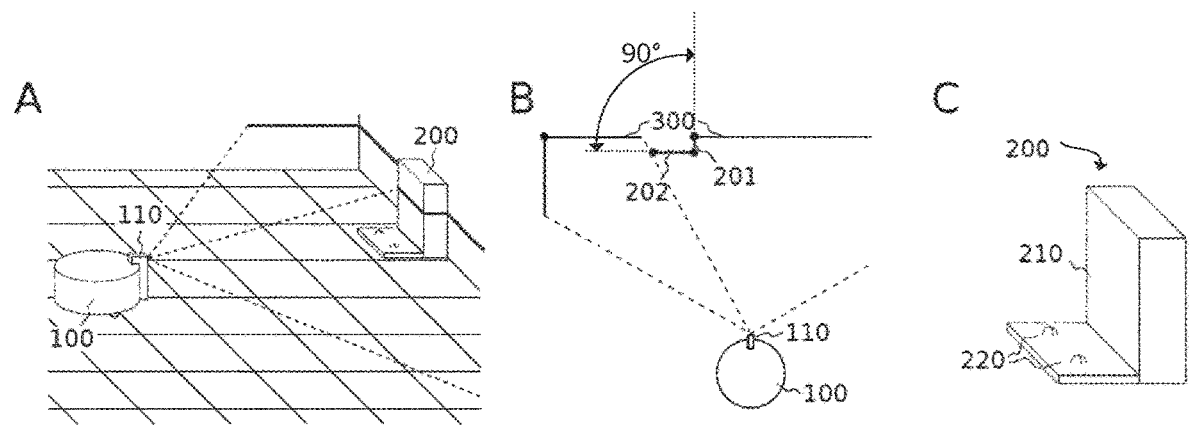
FIG. 1 shows a robot with a base station in its area of robot operation.

In general, a mobile robot should be able to dock onto its base station reliably and safely. Known systems (base stations and robots) and methods for finding and recognizing a base station and its exact position and orientation often employ special sensors in the robot (e.g. a light beam), complex image processing algorithms, which must be executed in addition to the navigation algorithms, and/or special markings on the base station or in the area in which the robot is operated. Further, the locating of the base station and the docking of the robot onto the base station should be robust against many different kinds of disturbances. For example, shifting of the base station may impair a reliable localization of the base station. The functionality of the sensors employed by the robot for navigation cannot be reliably tested in an unknown environment, such as in the area in which the robot is operated. The approach to the base station (docking maneuver) may sometimes end in a failed charging contact due to odometry errors. The user, for example, may place obstacles near the base station that disrupt the docking maneuver and thus result in a failed docking.

In view of the deficits of common robot base station systems and methods for identifying and localizing a base station, as well as for the reliable docking of the robot onto a base station that were described above, a need exists for improvements. For example, it would be desirable to make the localization of the base station of the robot possible using a navigation sensor already present in or on the robot, without the need for the base station to send out a signal or for special markings to be attached to it. In accordance with some of the embodiments described here, for this purpose the base station is recognized and localized with the aid of its geometric shape (e.g. certain geometric characteristics (outer form/shape) of the housing of the base station). This means that the base station itself exhibits, due to its outer form/shape, at least one geometric feature, with the aid of which the robot may recognize the base station. Special markings on the housing of the base station (which nevertheless have no influence on its geometric form/shape) or the emission of a (locating) signal are no longer necessary. In general, a robot should quickly and reliably find its way back to its base station after completion of its (e.g. cleaning) task. In accordance with some of the embodiments described here, for this purpose the position of the base station is marked on a map and is kept current by means of various methods. A further desirable capability of the robot is that it be able to maintain its bearings (to accurately and quickly orient itself) in different areas in which the robot operates (such as, for example, on the various floors of a building). In accordance with some of the embodiments described here, for this purpose one base station is employed in each of the areas in which the robot operates that the robot is able to distinguish from one another. The robot links a map of the respective area of operation with each base station. Once the robot has identified a specific base station, it can immediately begin a (self) localization with the aid of the map that is linked with each base station.

A further desirable capability of a mobile robot is a robust and exact docking onto the base station so that, for example, a contact between the charging contacts of the robot and those of the base station can be reliably carried out. In accordance with some of the embodiments described here, for this purpose, after reaching a previously calculated docking position, the position and orientation of the robot is slightly corrected in order to be able to safely dock. A docking should also be possible in the case of possible disturbance (e.g. access to the base station is blocked). In accordance with some of the embodiments described here, for this purpose a possible disturbance is detected and the user is informed of it.

In general it would be desirable for it to be possible to test the functionality of a navigation sensor of the robot within its area of operation and, if necessary, to recalibrate it. In accordance with one of the embodiments described here, for this purpose a base station with its a-priori known geometric parameters is employed.

FIG. 1A shows an autonomous mobile robot 100 and a corresponding base station 200 in an operation area of the robot. The robot has a navigation module with at least one navigation sensor 110 for orienting itself in its environment and for navigating throughout the operation area of the robot, thus enabling it to autonomously carry out a task. The navigation module of the robot 100 collects with the aid of the navigation sensor 110 information regarding the position of "navigation features" in the environment of the robot, e.g. geometric features of objects such as, e.g. those of obstacles, as well as information regarding the floor covering, etc. Geometric features are, for example, surfaces (e.g. a wall), lines (e.g. the contours of a wall, furniture or other objects in the environment of the robot 100) and points (e.g. on corners or edges of objects in the environment of the robot 100). Every navigation feature can be associated with a position (including orientation) in the room and, if needed, recorded on the electronic map of the robot 100. The navigation module operates, for example, using an obstacle avoidance strategy and/or a SLAM algorithm (Simultaneous Localization and Mapping) and/or one or more maps of the area in which the robot operates. The robot can create a new map of the robot operation area while in operation or it can make use of an already existing map before beginning its task. An already existing map can be created by the robot itself during the completion of an early task, such as an exploratory run, or may be provided by another robot and/or a person.

The navigation sensor 110 detects information about the environment of the robot (and thus about the area in which it operates), in particular about its geometric features in one, two or three dimensions. The navigation sensor 110 may be, for example, a sensor for distance measurement such as, for example, an optical and/or acoustic sensor that detects the distance between the sensor and an obstacle by means of triangulation or by measuring the travel time of an emitted signal (e.g. a laser beam or an ultrasonic signal). Accordingly, e.g. triangulation sensors, time of flight cameras, laser scanners, ultrasonic sensors and the like may be employed as navigation sensors. With the aid of this navigation sensor 110, the navigation module of the robot 100 can determine the distance between the robot and the individual points, lines and/or surfaces of objects in the environment of the robot. The thus detected points, lines and/or surfaces are designated as "navigation features" and are saved on a map of the robot (i.e. the geometry of the navigation feature and its position, including orientation, is designated on the electronic map). Later, the robot can orient itself with the aid of these navigation sensors and/or avoid the detected obstacles, thus preventing collision. Another typical example of a navigation sensor 110 is a camera (e.g. with a CCD or CMOS image sensor) that has a detection module for identifying the corners and edges of object (navigation features) in the environment recorded on an image by means of image data processing. In this manner the position of a navigation feature within a projected plane relative to the robot can be determined. When the robot moves, the position, including the orientation, of the navigation feature and that of the robot within the room can be determined on the basis of this movement. This procedure is known as visual SLAM.

FIG. 1C shows a simple example of a base station 200. It consists of a main body 210 with geometric features that can be detected by the navigation sensor as navigation features. The main body 210 of the base station 200 may include various further components such as, for example, components for charging the battery of the robot 100 or for vacuuming out dirt. Two charging contacts 220, for example, are arranged on the base station 200. Corresponding contact are arranged on the robot 100 which must come into contact with the charging contacts 220 in order to allow a successful charging of the robot battery. This means that, in order to charge its batter, the robot must dock onto the base station at a certain position and in a certain orientation. The position and orientation required for this (and, thus, the path to be followed), can be determined by the robot when the position and orientation of the main body 200 are known to it.

In accordance with the embodiments described here, the geometric characteristics of the base station 200 (i.e. its outer form/shape or its individual parts) are detected as navigation features with the aid of the navigation sensor 110 of the robot for the purpose of its navigation. By determining and interpreting the characteristics of the navigation features (with the aid of the navigation module of the robot), the navigation features of the base station, and thus the base station itself, can be definitively and without a great deal of additional effort identified, their position and orientation in the robot's environment can be determined and they can be recorded on the map of the robot. Simple criteria are used to achieve this purpose such as, for example, (1.) the distance separating certain points (e.g. corners) of a feature from other features, (2.) the length of edges/segments/lines, (3.) the size of surfaces, (4.) the location of features relative to each other, in particular the angle between two edges, segments or lines or the angle defined by three specific points (corners), (5.) ratios (relative sizes, lengths), e.g. the ratio between the lengths of two lines, and (6.) error metrics, such as the (squared) deviation of the (erroneous) measurement from the construction-related standard values (with the aid of a larger quantity of points, a straight line, for example, can be determined that can be established by means of linear regression; the degree of deviation of a specific point from the regression lines can serve as a criterion as to whether the given point altogether belongs to the assumed line).

For example, at least some of the detected features designate a width, a depth and/or a height of a part of the main body of the base station. The criteria used to locate the base station should be easy to calculate and be robustly determinable from various positions. This is explained in greater detail in the following.

Figure 2:
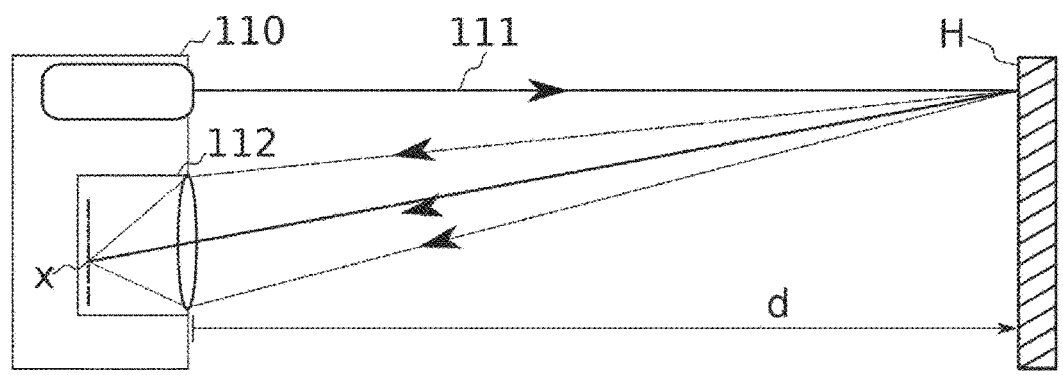
FIG. 2 schematically shows by means of a drawing the optical distance measurement using triangulation.

In the example shown in FIG. 1A, the distance to obstacles in the environment of the robot is determined, e.g. by means of optic triangulation, for the purpose of which structured light (in a visible or non-visible range) in the form of a line running approximately parallel to the surface of the floor is emitted. The principle of optical triangulation is illustrated in FIG. 2. The emitted structured light 111 strikes an obstacle H and is diffusely scattered off of it. A camera takes a picture of the environment that depicts the light that is reflected back from the obstacle (e.g. a light line). By means of triangulation, the distance d to the illuminated obstacles H at selected points or along the entire line can be determined based (in the case of a horizontal light line) on the vertical position x of the structured, reflected light (i.e. of the light line) in the picture.

In order to ensure good detection, the base station 200 is geometrically designed such that, because of its height, it is illuminated by the light emitted from the navigation sensor 110 and, because of its depth, is clearly distinguishable from a wall. Furthermore, the surface of the base station is designed such that the light emitted from the navigation sensor 110 is reflected in a well diffused state (meaning that it exhibits no absorbing or mirroring surfaces).

FIG. 1B shows, as an example, the possible results of a sensor measurement of the scenario shown in FIG. 1A. In particular, the robot 100 recognizes with the aid of its navigation modules and its navigation sensors 110 two line shaped navigation FIGS. 201 and 202 stemming from the measurement of the base station. In the following, the navigation features 201, 202 will be designated as boundary lines or, in short, as lines. These two lines 201 and 202 each have a characteristic length which corresponds to the width (in horizontal direction) of the side surface (line 201) and of the front surface (line 202). Further, the two lines 201 and 202 include a certain angle (e.g. a right angle). If, for example, the base station 200 (e.g. in a horizontal plane that lies at a certain height above the floor) has a rectangular cross sectional area having side lengths of, e.g. 5 cm and 15 cm and the robot 100, with the aid of its navigation sensor 110, detects two almost rectangular lines having lengths of nearly 5 cm (line 201) and 15 cm (line 202), then the robot 100 can interpret these lines as the base station. In addition to this, use may be made of the side ratio of 5:15=1:3. As illustrated in FIG. 1B, one side of the base station cannot be recognized by the robot due to the shadowing caused by the front surface of the navigation sensor. In order to detect this additional geometric feature of the base station as well, the robot can move round the base station until it has also reliably recognized the second side surface. Thus, in this case, the base station will be regarded from at least two different positions.

In the methods described above, the base station 200 is recognized solely based on its rectangular form. In such cases, the probability for an erroneous detection is high, as any rectangular object (for example, a box) having the corresponding side lengths would be recognized as the base station. Furthermore, the described corners will have generally been replaced by rounded edges, both for safety reasons (risk of injury), as well as for reasons of design. In principle, such rounded edges are also detectable with the aid of the navigation sensor described above. The calculation effort needed for the processing of rounded forms, however, is greater than that needed for straight lines.

For this reason, in accordance with the embodiment described here, the inside of the base station is also utilized for its detection. For this purpose, one or more openings are introduced into the main body of the base station. Individual components (for example, for vacuuming dirt) of the base station may be visible through these openings. This may also be omitted, however, so that only one or more inner walls can be recognized.

FIG. 3A shows an example of a base station 200 with rounded edges and two openings 230 arranged in the front side of the base station. FIG. 3B shows a cross section view through the base station 200 of FIG. 3A, wherein the section plane is a horizontal plane that lies at a certain height above the floor. This certain height is the height at which the navigation sensor 110 carries out the distance measurement to obstacles in the environment of the robot. FIG. 3C shows an example of the results of such a measurement when the robot is standing at a certain distance (for example 0.5-1 m) in front of the base station. From here it can see parts of the back wall of the base station 200, which all lie along one line. In addition to this, the robot can determine the position of four points (1, 2, 3, 4) with negligible measurement errors. The position and size of the two openings 230 (windows) has been chosen in this case such that the distance separating any of the two points is different for each pair of points, (meaning, in particular, that d(1; 2)≠d(1; 3)≠d(1; 4)≠d(2; 3)≠d(2; 4)≠d(3; 4), wherein d(i, j) designates the distance between point i and point j). These distances can be easily calculated and compared to stored standard values. The distance separating the points from the line formed by the back wall may also be compared, for example. The ratios of the distances to each other may also be taken into consideration. By using an error function such as, for example, the coefficient of determination of a regression model, the degree of exactness with which the points 1, 2, 3, and 4 lie along a line parallel to the back wall can be tested. By these means numerous features are made available that significantly reduce the probability of an erroneous detection, so that in daily practice it will virtually not occur.

To protect the inside from contamination, a cover 250, made of a transparent material that allows the light emitted from the navigation sensor 110 to pass through, may be arranged over the openings 230. The emitted light may lie, for example, in an (infrared) spectrum that is not visible to humans, so that the cover as viewed by the robot is transparent, but, as viewed by humans, will appear colored and nontransparent. Such a cover 250 should not only cover the openings 230, but should also, independent of this, be used to form differing geometric shapes that can be recognized by the user and the robot. In this manner, aspects of design may be combined with a simplified detectability. The cover 250 may be provided with an antireflective coating that is matched to the wavelength of the light emitted by the navigation sensor 110.

In the case of the described measurement in a (horizontal) plane, the latter may slightly vary in its distance to the floor (e.g. due to differing installation heights of the navigation sensor 110 or when the plane of measurement is not completely parallel to the floor, e.g. because the robot is standing somewhat askew). In order that the base station may be reliably recognized in this plane based on its geometric form, at least a selection of the recognizable navigation features (or more specifically, their underlying dimensions) must be found in the environment of the expected cross section measurement, irrespective of the actual height of measurement (the distance of the plane in which the distance measurement is carried out from the floor).

In some applications, the robot will be employed in two mutually isolated areas of robot operation such as, for example, on two different floors of a building. In each of the areas of operation a base station 200 is located that the robot 100 can definitively recognize with the aid of its navigation sensor 110. If the robot 100 is thus now capable of differentiating between the base stations 200, it also immediately obtains information as to which of the various areas of operation it is located in without the need for the user to additionally intervene.

In order that the base stations 200 be distinguishable, some parts of the geometric form of the base station, for example, may be altered by the user (e.g. at the time the base station is put into operation), meaning that a feature that is recognizable by the navigation sensor 110 may be altered in a previously defined manner. This alteration can be achieved, for example, by shifting, removing or adding parts to the base station. In the case of the exemplary base station 200 in FIG. 3A, an alteration can be carried out by changing the size (width) of one of the two openings, for example. Thus, for example, the location of point 3 (FIG. 3C) can be varied by adding, for example, an additional screen. For example, a sliding screen may be arranged behind the centre panel between the two viewing windows.

Autonomous mobile robots 100 that mark their base stations 200 on a map are basically known. Often the base station serves as the starting point of the map, i.e. the base station has a permanent position on the map. The position of the base station, however, can change. Detecting the base station based on characteristics (navigation features) that can be detected by the navigation sensor 110 makes it possible to easily update the position of the base station on the map. However, it is also possible to detect the base station by other means, thereby allowing the position of the base station on the map of the robot to be updated. The change in the position of the base station may be carried out by a user, e.g. (1.) while the robot is in operation or (2.) while the robot is docked on the base station. Furthermore, due to measurement and odometry errors, the mapping carried out by the robot and/or its localization on the map (SLAM) may lead to the result that the position of the base station anticipated by the robot does not correspond to its actual position. In the worst case, this can result in the loss of all (meaningful) information about the position of the base station. In the following, examples will be used to explain how this problem can be solved, or at least mitigated.

Position updates using a SLAM algorithm—SLAM algorithms (Simultaneous Localization and Mapping), by means of which the position of the robot and selected navigation features that have been detected by the navigation sensor are continuously correlated, are often employed for the navigation of autonomous mobile robots. This enables to robot to carry out a robust mapping despite measurement and odometry errors. SLAM demands a relatively high amount of computing capacity, which is why only a few selected and readily visible navigation features such as, for example, walls are taken into consideration in order to limit the needed calculation effort. The positions of the navigation features (and those of the robot) that are tracked in the SLAM algorithm are continuously corrected; meaning they are at no permanent (relative) position in relation to other objects that are not tracked in the SLAM algorithm. The features of the base station are generally too small to be tracked by the SLAM algorithm and they may therefore shift their recorded position relative to a wall (which is tracked by the SLAM algorithm). This can result in the recorded position being located in the wrong room or even outside of the area of operation. For this reason it is useful to update the position of the base station.

Since the base station also has detectable geometric features (navigation features), the position of the base station can be easily kept current using the SLAM algorithm. For this purpose, for example, at least one easily detectable feature of the base station (cf. FIG. 3) is selected and tracked with the aid of the SLAM algorithm. This can be, for example, the segment formed by points 2 and 3 in FIG. 3C. As an alternative, a feature can also be used that has been detected in the proximity of the base station. This can be, for example, the line 300 in FIG. 1B, which is formed by the wall against which the base station stands. In both cases the robot records which of the features tracked by the SLAM algorithm determines the position of the base station. In addition to this, the robot can save the position of the base station relative to this navigation feature. When the robot wants to return to the base it can move to a position near this feature, thus ensuring that it will reliably find its way back again.

Position updates during operation of the robot—In the event that the base station, for example, is moved by the user while the robot is in operation, it is advantageous for the robot 100 to recognize the base station 200 when moving past it and to update the map with the new position. Since the navigation sensor detects features of the base station to navigate the robot, it is sufficient in this case for the newly detected features to be tested as to whether they might be part of the base station. In this case, as a first step, an easily recognized feature, for the detection of which only a small amount of additional calculation time is required, can be used. After recognition has been confirmed, further characteristics of the base station can be tested.

For example, in the case of the base station in FIG. 3A, segments (e.g. lines of a certain length and orientation) can be looked for that correspond in their length to the distance separating points 2 and 3 in the FIG. 3C. After such a segment has been found, it can be further tested as to whether a back wall is recognizable, whether this is at the correct distance, and whether the points 1 and 4 are present and lie along one line. While doing so, the length of recognized segments, for example, can be routinely detected by the navigation module in order to test them regarding their relevance for the navigation.

Once the base station has been recognized at a new position, various options for further action become available to the robot. If the new position deviates only slightly from the former one (for example, by a distance of less than 1 m), then the new position of the base station is recorded and the former one is deleted. This is particularly useful when the navigation sensor simultaneously examines the former position of the base station and no base station is detected at this position. If a base station is detected at a location in the area of robot operation that is far away from the previous base station, then this may be due to the presence of a second base station. In this case the position of the base station is newly recorded and the former position is retained for later verification. When the robot is in the proximity of the former position, it tests whether the base station is still present. Depending on the result, the former position is either deleted or it is recorded that there are two base stations located in the area of operation of the robot. The respective positions (including orientation) of both base stations can be saved on the map.

It can also occur that the robot, according to the information on its map, finds itself in the proximity of a base station but does not detect it. This may be the case if the position of the base station has been changed by the user, but also if the user has only temporarily removed it, for example to clean it. In the simplest case the robot will delete the position of the base station from the map data. Alternatively, this position on the robot's map may be marked as "questionable". If while carrying out its operational task the robot later recognizes a base station at a different position, then the position marked as questionable is deleted and the new position of the base station is recorded. In the opposing case, the robot returns to the position marked as questionable when it wants to return to the base station. If again no base station is found at this position, then a special search program is started to find the base station, wherein the robot moves around the area of operation and looks specifically for features (navigation features) of the base station. In addition to this, a message can be sent to the user (e.g. by means of a user interface, e.g. an application on a tablet computer or mobile telephone), allowing the user to react to the situation, if needed.

Figure 3:
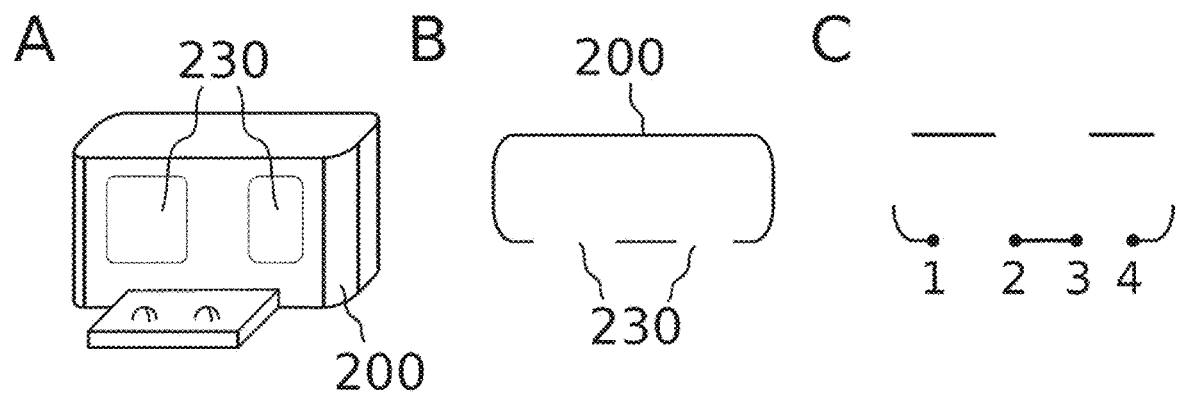
FIG. 3 shows an example of a base station with geometric features that are detectable by the navigation sensor of the robot and which are defined by openings in the front housing wall of the base station.

The measurement accuracy of the navigation sensor 110 may deteriorate as the distance to the object to which the distance measurement is to be carried out increases. In the case of object with elongated dimensions, the accuracy also depends on their orientation. This may particularly be the case when triangulation sensors are used. If, for example, the base station 200 of FIG. 3 is viewed directly from the front, then the distance separating the points 2 and 3 can be determined at a distance of approximately 2 m with sufficient accuracy. If the base station, however, is viewed from an angle of 45°, then, in order to ensure a reliable measurement, the distance between the base station 200 and the robot 100 should not exceed about 1 m. Based on this, a maximum distance for testing whether a detected navigation feature belongs to the base station can be determined in order to improve the quality of the detection of the base station. The maximum distance for carrying out a test may also depend on the orientation of the feature (relative to the robot).

Position updates at the start of robot operation—A user may move the robot together with the base station while the robot is docked onto it and while the robot, for example, is in pause modus. If the robot is using an existing map that, for example, it had compiled while carrying out a previous operational task, then its new position (and that of the base station) will no longer correspond with the existing navigation information. In accordance with the embodiment described here, the robot may carry out the following steps at the start of its operational task: (1.) Exit the base station and collect map data that is relevant for its operational task; (2.) Localization of the robot in the existing map data; and (3.) Update of the position of the base station in the map data.

The self-localization of the robot can be carried out in this case using an algorithm that determines the position of the robot on the map by comparing the data detected by the navigation sensor with the existing map data. In order to accelerate the localization algorithm, the former, known position of the base station can be used as a first localization hypothesis for the location of the robot. If, for example, in step 2 described above the localization of the robot fails, then the robot begins to compile a new map and the position of the base station is recorded in this new map. Upon completion of the robot's operational task, the user can be informed of the newly compiled map and can be asked whether it should be used to replace or augment the former map.

Navigation in numerous areas of robot operation—A robot may be employed in two or more mutually isolated areas of robot operation such as, for example, on various floors of a building. A base station, which the robot can definitively identify with the aid of its navigation sensor (as described above), may be located in each one of the areas of operation. As a result of this identification of the base station, the robot "knows" which area of operation (e.g. on which floor) it is located in. Thus the navigation module of the robot can load the map data that is linked with the respective base station. A prerequisite for this is that the user positions the robot in advance on one of the base stations or in the proximity of one of the base stations. The robot can start a localization using the loaded map data. When doing so, as described above, the robot can use the position of the base station known from the map and its relative position to the same in order to accelerate the localization. This is done, for example, by using the position of the base station (or the docking position of the robot) as a localization hypothesis. In an alternative form, the area on the map in which the robot is attempting to localize itself is limited to an area surrounding the base station. This area is, for example, a square in front of the base station (and bordering on the same) or a circle around the base station. The lateral lengths/radius can depend on the distance between the robot and the base station.

In accordance with a further embodiment, the robot carries out the following steps for the purpose of localization: (1.) Exit the base station; (2.) Detect and identify the base station; (3.) Loading of map data linked with the base station; (4.) Localization of the robot on the map bases on the loaded map data; and (5.) Update of the position of the base station in the map data. Step 1 is optional, depending on whether the robot is docked on the base station or not at the start.

If no map data is linked with the recognized base station or the localization on the respective map fails, a new map of the robot's area of operation is compiled. After the robot has completed its operational task, the user can be informed about the newly compiled map. The robot can ask the user whether the new map should be linked with the base station and permanently saved. In an alternative embodiment, the robot, in the event of a failed localization, can attempt a localization using the map data associated with other base stations. This may be useful, for example, if the user has replaced the base station with different one.

Navigation sensors such as, for example, sensors for distance measurement (see e.g. triangulation sensor in accordance with FIG. 2), are very sensitive measurement systems. A disturbance such as, for example, an impact, can result in a decalibration of the sensor, leading to consistently erroneous measurements. This can significantly impair the navigation of the robot through its area of operation. In order to ensure the reliable functioning of the robot it may be necessary to systematically recognize measurement errors of the navigation sensors and, if possible, compensate them by means of calibration. A basis station in accordance with the embodiments described here may be employed for this purpose (calibration), because it has well defined geometric features that are easily recognized by the navigation sensor.

A decalibration of the navigation sensor can be determined, for example, by measuring the distance, the length, the size and/or the angles of one or more geometric features (or more specifically, the thus derived navigation features) of the base station and by comparing these with a corresponding standard value. This standard value can also be used to recalibrate the navigation sensor. In addition to this, individual geometric features of the base station may be designed such that their measurement allows for a direct inference to be drawn about at least one of the parameters of the navigation sensor that is to be calibrated.

In order to improve the accuracy of the calibration, numerous independent measurements may be combined, so that a measurement error of a single measurement will have less overall impact. For this purpose, numerous independent geometric features of the base station (such as, for example, width and depth, cf. FIG. 1B and FIG. 3) may be measured. Alternatively or additionally, the same measurement may be carried out at different distances to the base station. In particular, the travelled distance (odometry) between two measurement positions may be taken into consideration.

One example of a navigation sensor (in particular, a sensor for distance measurement) is a triangulation sensor, which emits structured light (see FIG. 2, light beam 111) from a light source and takes a picture of the thus illuminated environment with a camera (see FIG. 2, camera 112). Based on the camera picture and the relative position between the camera and the light source, the distance (see FIG. 2, distance d) to an obstacle can be determined. Small changes in the relative position, caused by a shift (e.g. by approximately 1 µm) or a rotation (e.g. by approximately 0.01°) of the light source (and thus of the light beam 111) relative to the camera 112 (brought about, for example, by impact) may result in systematic errors in the distance measurement that lead to a decalibration of the (previously calibrated) navigation sensor 110. An example is shown in FIG. 1A in which, with the aid of a triangulation sensor (navigation sensor 110), the (horizontal) cross section of the base station 200 is detected. A possible result of this measurement can be seen in FIG. 3C. From this sensor data, various dimensions (dimension values) that allow for an inference to be drawn about the quality of the distance measurement can be derived. For example, (a) the distance separating the points 1 and 4 can be determined and compared with the (known) actual width, (b) the distance of one or more features on the front side of the base station (such as points 1, 2, 3 and 4) to the back wall can be determined and compared with the (known) actual depth of the base station; (c) it can be tested whether the points 1, 2, 3 and 4 lie along one line, and/or (d) the angle between the back wall and the line defined by the front features (points 1, 2, 3 and 4) can be determined (in the present example, this angle should ideally be zero, i.e. the line is parallel to the back wall). In particular, the distance separating the robot 100 and the base station can also be determined, based, for example, on the width and/or depth of the base station 200. This value may be used to calibrate a distance measurement.

One particular challenge for the accuracy of a calibration using the base station 200 can be its relatively small construction size (as compared with large furniture). Although the navigation sensor should provide exact measurement results over the course of numerous meters, the base station itself is only a few centimeters wide and deep. By arranging mirrors within the base station the light path inside of it can be extended. In this manner the accuracy of the calibration of a navigation sensor that emits targeted light can be improved. For example, in the base station in accordance with FIG. 3A, the inside of the back wall can be mirrored. In such a case this would make the inner surface of the front housing wall visible to the navigation sensor 110, meaning that the depth available as a measurement path will be twice that what it would be without the mirroring.

In the case of a triangulation sensor, the following sensor parameters can be calibrated: Distance of the image sensor (e.g. CCD or CMOS sensor) from the lens (focal length); the distance of the optical axes from the light source (e.g. laser and lens); the inclination of the measurement plane (corresponds to the inclination of the optical axis of the light source, see FIG. 4A, Case b); zero point of the position x on the image sensor (see FIG. 2). In particular the last two mentioned parameters (inclination of the optical axis of the light source and position of the zero point on the image sensor) can, in the event of a decalibration, greatly falsify the distance measurement, especially at long distances, which results in systematic measurement errors. Both of these triangulation sensor parameters can be calibrated, for example by measuring the width of the base station (or the distance between points 1 and 4 in FIG. 3C) and by adapting (calibrating) the parameters such that measured value corresponds with a known reference value. The depth of the base station (e.g. the distance of point 3 from the back wall, see FIG. 3C) is also known and may be used for the calibration of the mentioned parameters.

Whereas, in accordance with the previously described example, only the form of the base station in a horizontal sectional plane is taken into consideration, alternatively or additionally to this navigation features that are dependent on the distance to the floor of the (horizontal) measurement plane may also be considered.

Figure 4:
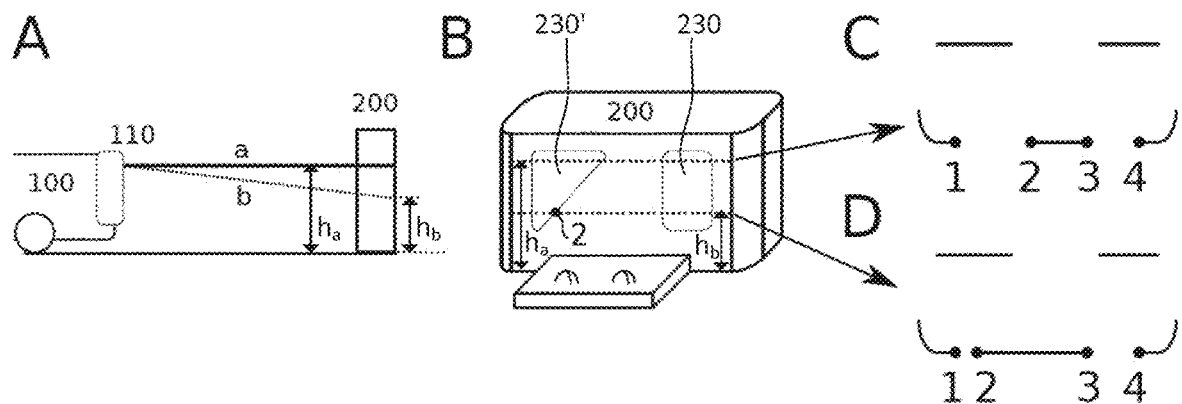
FIG. 4 illustrates the detection of the geometric figures of a base station using the navigation sensor of the robot, as well as possible systematic measurement errors.

FIG. 4A shows a robot 100 with a navigation sensor 110 (in particular a triangulation sensor) that is carrying out a measurement of the cross section of the base station 200. In the ideal case, the measurement is carried out in a plane that lies parallel to the floor at a distance to the floor h (Case a in FIG. 4A), but it may also deviate from this (Case b in FIG. 4A). FIG. 4B shows a base station 200 that is comparable to the example of FIG. 3A, however with an opening 230' (window) that is formed such that the position (and/or the extension) of a navigation feature is dependent on the distance to the floor (punctured line in FIG. 4B) at which the sensor measurement is carried out. FIG. 4C represents, as navigation features, the corner points of the openings 230 and 230' of the base station for Case a (distance to floor of the measurement h=$h_a$), and FIG. 4D represents, as navigation features, the corner points of the openings 230 and 230' of the base station for Case b (distance to floor of the measurement h=$h_b$). In Case b, the point 2, as compared to Case as, is shifted to the left, which results in the distance between point 1 and point 2 in Case b being smaller, and the distance between the points 2 and 3 being greater, than in Case a. By measuring the base station at various distances it can be directly determined, for example, whether the sensor measurement is being carried out parallel to the floor surface or, if not, how large the tilt of the measurement plane is relative to a horizontal plane. Thus, with this procedure, in addition to the two-dimensional cross section measurement, the third dimension of the base station is also used to directly determine and calibrate a sensor parameter (here the inclination of the optical axis of the light source or the measurement plane of the navigation sensor). For this, the base station requires a geometric feature (e.g. the position of point 2 or the distance between point 1 and 2) that definitively depends on the distance to the floor h.

In accordance with a further embodiment, the navigation module calculates a docking position from the detected geometric features (navigation features) of the base station and then directs the robot into this position. If the measurements of the navigation sensor are erroneous, the docking maneuver may fail, as then the calculated docking position will not correspond with the actually needed one. The calculation of the docking position depends on one or more parameters that can be calibrated if the exact docking position is known. These parameters are, for example, the position of the navigation sensor 110 on the robot 100, but also, for example, the shifting of a mirror of the optical reception device of the navigation sensor 110. The calibration can be carried out by means of a method based on trial and error. For this purpose, the calculated docking position is varied and used to carry out the docking maneuver. This is done repeatedly and the rate of success is measured. The docking position with the highest rate of success is then used to calibrate the needed parameters.

Figure 5:
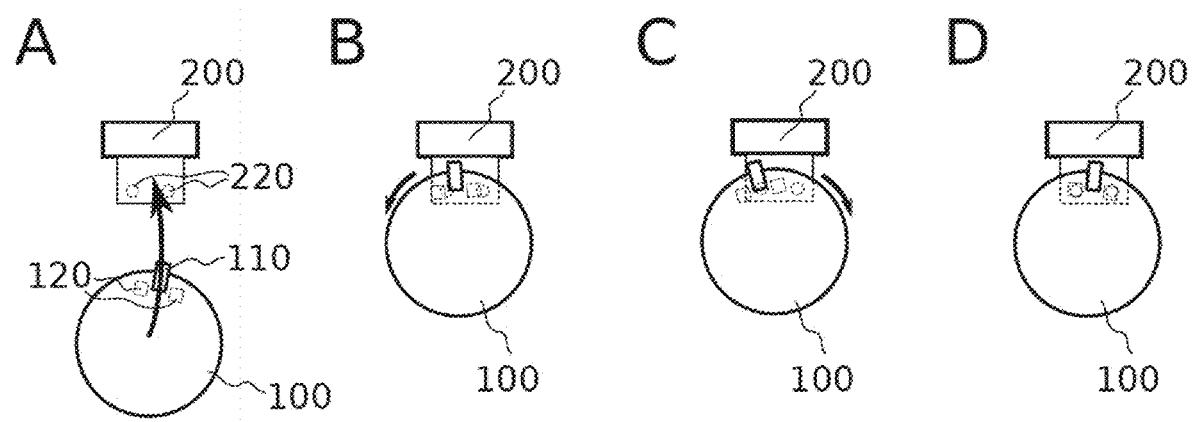
FIG. 5 illustrates a method for docking a robot onto a base station, wherein the robot continues to vary its orientation until it has correctly docked.

As described further above, the robot 100 can determine its docking position and orientation based on the position of the base station 200. In accordance with the example illustrated in FIG. 5A, the navigation module can determine a path for the robot based on its calculated docking position and orientation and can direct the robot to this docking position. Nevertheless, the actual final position and final orientation of the robot 100 (at docking) may deviate from the planned and needed docking position and docking orientation due to odometry errors. FIG. 5B shows that errors may occur merely due to small deviations, e.g. entailing that no contact between the charging contacts 220 of the base station and the corresponding charging contacts 120 of the robot will be established, thus impairing the autonomous functionality of the robot 100.

In order to correct a small deviation in the position of the robot and/or its orientation from the actually needed docking position and/or orientation after completion of a docking maneuver, the robot 100 minimally varies its position (e.g. orientation). As shown in FIG. 5C, by means, for example, of a small rotation a charging contact can be established despite a less than exact docking position (see FIG. 5D).

Beginning in the first docking position in accordance with FIG. 5B, the robot, for example, carries out a first rotation to the left by a predefined angle $\alpha$. As depicted in FIG. 5C, this does not necessarily lead to success, which is why a second rotation in the opposite direction is carried out. In order to cover a symmetric area around the original orientation, the second rotation is carried out, for example, by an approximately twofold angle $2\alpha$ of that of the first rotation, however in the opposite direction.

Whether or not the needed docking orientation has been achieved can be determined, for example, by the presence of a voltage on the charging contacts or by means of a contact switch. If, for example, no successful contacting has been achieved, the robot can return to its beginning orientation after completing the described rotations.

In order to further increase the robustness of the docking maneuver onto the base station, the latter can be provided with one or more (flexibly mounted) nibs which engage in corresponding grooves on the robot. In FIG. 1C these are formed, for example, by the two charging contacts 220. By means of the rotation of the robot, these nibs can slide into the corresponding grooves on the robot and thus define an exact docking position and orientation. Connections for vacuuming out a dirt container on the robot by the base station or for refilling cleaning agents may fulfill a comparable function.

In order to ensure a successful docking maneuver, a certain docking area in front of the base station should be free of obstacles. This area should be large enough for the robot to be able to reliably recognize it when it passes by and it should afford enough space for a docking maneuver that is as simple and direct as possible. Such an area, for example, should afford a space on both the right and left side of the base station that is approximately equivalent to the diameter of the robot and a space in front of the base station approximately equivalent to twice that of the robot's diameter.

The influence of the user may result in various disturbances such as, for example, (i) the base station is so positioned that a wall runs through the docking area (in particular because the base station was placed too close in the corner of a room; (ii) small obstacles, such as the leg of a chair or scattered shoes are present in the docking area, blocking part of the approach path; (iii) small obstacles such as a cable or an article of clothing are left lying in the docking area that impede the movement of the robot, for example, by causing an increased slipping of the wheels.

In general, the user will not intentionally cause these disturbances and will not intentionally place obstacles in the robot's path that impair access to the base station and thus a safe docking. In accordance with the embodiments described here, the attempt is made to detect such problems early and to then inform the user of them so that he may remove the disturbance. The robot, for example, is provided with a detection module that can recognize that calculating and/or travelling along the docking path has been significantly impaired or made impossible, for example, by one of the disturbances described above. The navigation sensor, for example, can be used for this by detecting obstacles in the docking area. Smaller obstacles in the docking area that the robot can drive over, for example, can be recognized by a sensor that detects an odometry error such as, for example, slipping.

In order to inform the user of a recognized problem, the robot possesses at least one communication interface (also known as Human Machine Interface HMI). This may comprise a visual display directly on the robot or a sound signal, in particular a voice output. In addition to this, the possibility exists of establishing a connection to an external device such as, for example, a smart phone or a tablet computer via WLAN, allowing information to be sent to the user. This information includes, for example, the nature of the detected disturbance.

Further, the robot can assess how severe the disturbance is and provide the user with this information (e.g. a minor problem (level I, interaction by the user not immediately needed), a relevant problem (level II, interaction by the user recommended/advisable), a grave problem (level III, interaction by the user required)). In this way the user can decide how crucial it is to intervene. For example, the base station may have been placed too close to a wall, disturbing the docking procedure but not rendering it impossible (level I or II). In this case the user can decide that the base station should remain at its present position and the robot should attempt to dock. On the other hand, the user may have accidentally placed the leg of a chair in front of the base station, rendering a direct docking maneuver impossible (level III). This problem can be quickly remedied by the user, thus ensuring the functionality of the robot. In accordance with the measures taken the user can report back to the robot via the communication interface. This report will state, for example, that; (i) the problem has been remedied; (ii) the problem is to be ignored and a docking attempted; (iii) the docking maneuver is to be postponed and the problem will be remedied later. This classification of disturbances is, naturally, only of exemplary nature and may also be carried out in any other desired manner.

In order that the user be informed of problems as soon as possible, the robot should always carry out the detection of disturbances immediately upon leaving the base station, hence in particular at the start of a new operational task.

Finally, it should be mentioned that the technical features of the devices, methods and systems described here using various examples may generally be combined with each other to arrive at other embodiments. Such combinations are generally possible and useful, unless explicitly stated here otherwise. It should be understood that all of the methods described here are to be carried out by the robot. This means that the robot includes a robot controller that is generally programmable and is, depending on the application, programmed such that the robot can carry out the respective method. The robot controller need not necessarily be realized in a single component of the robot. In general, all components that influence the externally visible behavior of the robot form a part of the robot controller. Thus, the robot controller does not have to be physically installed within the mobile robot, but may also be partially located outside of the robot in stationary (control) devices such as, e.g. computers that are connected with the robot via a communication connection.

The invention claimed is:

1. A system including an autonomous mobile robot and a base station for the autonomous mobile robot,
   wherein the autonomous mobile robot comprises a navigation module with a navigation sensor for detecting geometric features of objects in an environment of the autonomous mobile robot,
   wherein the base station comprises a geometric feature that is detectable for the autonomous mobile robot using the navigation sensor,
   wherein the robot comprises a autonomous mobile robot controller, coupled with the navigation module and configured to identify and/or localize the base station, based on the geometric feature of the base station, and to determine a docking position of the autonomous mobile robot;
   wherein the base station has a housing wall, the housing wall has at least one opening, and the at least one opening defines the geometric feature of the base station, and
   wherein the at least one geometric feature is a width of the at least one opening.

2. The system of claim 1,
   wherein the navigation sensor is designed to contactlessly measure distances between the navigation sensor and the objects in the environment of the autonomous mobile robot, and wherein the navigation module is configured to detect the geometric features of the objects in the environment of the autonomous mobile robot based on the measured distances.

3. The system of claim 2, in which the navigation sensor carries out distance measurements in an essentially horizontal plane with a defined distance to the floor.

4. The system of claim 1, wherein the navigation module is configured to detect the geometric features of the objects and store the detected geometric features of the objects on an electronic map of the environment.

5. The system of claim 1, wherein the geometric feature of the base station is selected from the group consisting of a characteristic point on the housing of the base station, a characteristic line on the housing of a base station, a polygon defined by the housing of the base station, a surface defined by the housing of the base station, or a combination thereof.

6. The system of claim 1, wherein the navigation module is configured to detect at least one geometric feature of the base station and the autonomous mobile robot controller is configured, for the purpose of identifying and/or localizing the base station, to assign a measurement value to the at least one detected geometric feature and to compare it with a corresponding reference value.

7. The system of claim 6, wherein the measurement value is selected from the group consisting of a length, a distance, an angle, a ratio of two lengths, a ratio of two distances, a ratio of two angles, or a combination thereof.

8. The system of claim 6, wherein the measurement value is selected from the group consisting of a distance between two points, a length of a line, a distance of a point from a line, a distance of a point from a surface, an angle defined by three points, an angle defined by two lines, a ratio of lengths of two lines, or a combination thereof.

9. The system of claim 1, wherein the opening is covered by a cover that is made of a material that is transparent for the navigation sensor.

10. The system of claim 1, wherein the navigation sensor is an optical sensor that emits light in a certain spectrum, and wherein the cover has an antireflective coating that is adapted to the spectrum of the light emitted by the optical sensor.

11. The system of claim 1, wherein the base station has numerous geometric features; wherein the navigation module is configured to detect at least one of the numerous geometric features of the base station; and wherein the opening is arranged asymmetrically in the base station such that the detected geometric features are asymmetrical in relation to a vertical symmetry plane.

12. The system of claim 1, wherein the opening is alterable in its size or form by attaching or sliding a screen or by breaking out a part of the housing wall along a predefined break line.

13. The system of claim 1, wherein the base station has numerous geometric features, and wherein the base station has a geometry entailing that the numerous geometric features of the base station are asymmetrical in relation to a vertical symmetry plane.

14. The system of claim 1, wherein the geometric feature of the base station is alterable by adding an attachment part to a housing of the base station or by removing an attachment part from the housing of the base station or by sliding or tilting an attachment part on the housing of the base station.

15. The system of claim 1, wherein the geometric feature of the base station is different when it is detected by the navigation module in horizontal planes that are at different distances to the floor.

16. The system of claim 1, in which the navigation module has a memory for numerous electronic maps, wherein each of the numerous maps is assigned to a certain base station and represents an area of autonomous mobile robot operation in which the certain base station is located.

17. The system of claim 1, further comprising:
a further base station, wherein the base station is located in a first area of autonomous mobile robot operation and the further base station is located in a second area of autonomous mobile robot operation,
wherein the navigation module has a memory for numerous electronic maps that is assigned to the base stations and the further base stations, and
wherein the navigation module, after identifying the base station, loads at least one of the numerous maps assigned to the base station.

18. A base station for an autonomous mobile robot comprising the following:
a housing with an opening arranged therein, the opening defining, by its geometry, a geometric feature that is detectable by the sensor system of the autonomous mobile robot, wherein the at least one geometric feature is a width of the opening.

19. The base station of claim 18, further comprising:
wherein the opening is covered by a cover including of a material that is transparent for the sensor system of the autonomous mobile robot.

20. A method for an autonomous mobile robot comprising the following: detecting geometric features of objects in an environment of the autonomous mobile robot using a navigation module of the autonomous mobile robot that has a navigation sensor, wherein at least one of the detected geometric features of the objects is a geometric feature of the base station;
identifying and/or localizing the base station based on the at least one geometric feature of the base station;
wherein the base station has at least one opening in its housing wall and the at least one opening defines a geometric feature of the base station, and
wherein the at least one geometric feature is a width of at least one opening.

21. The method of claim 20, in which the identifying and/or localizing of the base station includes the following:
assigning a measurement value to the detected geometric feature,
comparing the measurement value with a corresponding reference value.

* * * * *